United States Patent
Granström et al.

(10) Patent No.: US 12,511,559 B2
(45) Date of Patent: Dec. 30, 2025

(54) USING BAYESIAN INFERENCE TO PREDICT REVIEW DECISIONS IN A MATCH GRAPH

(71) Applicant: GOOGLE LLC, Mountain View, CA (US)

(72) Inventors: Johan Granström, Freienbach (CH); Bart Van Delft, Zürich (CH)

(73) Assignee: Google LLC, Mountain View, CA (US)

( * ) Notice: Subject to any disclaimer, the term of this patent is extended or adjusted under 35 U.S.C. 154(b) by 1161 days.

(21) Appl. No.: 17/419,228

(22) PCT Filed: Feb. 19, 2019

(86) PCT No.: PCT/US2019/018622
§ 371 (c)(1),
(2) Date: Jun. 28, 2021

(87) PCT Pub. No.: WO2020/142108
PCT Pub. Date: Jul. 9, 2020

(65) Prior Publication Data
US 2022/0121975 A1    Apr. 21, 2022

Related U.S. Application Data

(60) Provisional application No. 62/786,713, filed on Dec. 31, 2018.

(51) Int. Cl.
*G06N 7/00* (2023.01)
*G06N 7/01* (2023.01)
*G06N 20/00* (2019.01)

(52) U.S. Cl.
CPC .............. *G06N 7/01* (2023.01); *G06N 20/00* (2019.01)

(58) Field of Classification Search
None
See application file for complete search history.

(56) References Cited

U.S. PATENT DOCUMENTS 6,774,917 B1    8/2004  Foote et al.
8,452,778 B1 *  5/2013  Song .................. G06F 16/7844
                                                    707/748

(Continued)

FOREIGN PATENT DOCUMENTS

CN    101557483 A    10/2009
CN    104662528 A    5/2015

(Continued)

OTHER PUBLICATIONS

Naphade et al.("A Probabilistic Framework for Semantic Video Indexing, Filtering, and Retrieval" 2001) (Year: 2001).*

(Continued)

*Primary Examiner* — Lut Wong
(74) *Attorney, Agent, or Firm* — Lowenstein Sandler LLP

(57) ABSTRACT

Implementations disclose methods and systems for using Bayesian inference to predict review decisions in a match graph. A method includes identifying a current media item to be processed; processing labeled media items to identify labeled media items that include at least one respective segment that is similar to one of segments of the current media item; for each of the segments of the current media item, generating a segment prediction value indicating a particular property associated with a corresponding segment of the current media item based on properties associated with respective labeled media items that each include a respective segment similar to the corresponding segment; calculating a media item prediction value for the current media item based on a generated segment prediction value of each of the segments of the current media item; and (Continued)

causing the current media item to be processed based on the calculated media item prediction value.

20 Claims, 8 Drawing Sheets

(56) References Cited

U.S. PATENT DOCUMENTS

| | | | |
|---|---|---|---|
| 2005/0060350 A1 | 3/2005 | Baum et al. | |
| 2010/0280984 A1* | 11/2010 | Gengembre | G06F 16/583 |
| | | | 706/45 |
| 2013/0339433 A1 | 12/2013 | Li et al. | |
| 2017/0041330 A1 | 2/2017 | Hunt et al. | |
| 2017/0289624 A1* | 10/2017 | Avila | G06V 20/49 |
| 2018/0359530 A1 | 12/2018 | Marlow et al. | |

FOREIGN PATENT DOCUMENTS

| | | |
|---|---|---|
| CN | 106462810 A | 2/2017 |
| CN | 108009228 A | 5/2018 |
| CN | 108353201 A | 7/2018 |
| JP | 2012516493 A | 7/2012 |
| WO | 2002021438 A2 | 3/2002 |
| WO | 2018160199 A1 | 9/2018 |

OTHER PUBLICATIONS

Li Fuxin, et al., "Video Segmentation by Tracking Many Figure-Ground Segments", 2013 IEEE International Conference on Computer Vision, IEEE. Dec. 8, 2013, pp. 2192-2199.

International Search Report and Written Opinion dated May 13, 2019, for International Application No. PCT/US2019/018622.

Office Action for Chinese Patent Application No. 201980087180.2, mailed Jul. 22, 2024, 23 pages.

Office Action for Japanese Patent Application No. 202334730, mailed May 7, 2024, 06 Pages.

Office Action for Chinese Patent Application No. 201980087180.2, mailed Feb. 27, 2025, 14 Pages.

* cited by examiner

USING BAYESIAN INFERENCE TO PREDICT REVIEW DECISIONS IN A MATCH GRAPH

TECHNICAL FIELD

Aspects and implementations of the present disclosure relate to predicting review decisions and, in particular, predicting review decisions of media items.

BACKGROUND

Media items, such as video items, audio items, etc., may be uploaded to a media item platform. The media items may be labeled based on type of content of the media items, appropriateness of the media items, quality of the media items, etc.

SUMMARY

The following is a simplified summary of the disclosure in order to provide a basic understanding of some aspects of the disclosure. This summary is not an extensive overview of the disclosure. It is intended to neither identify key or critical elements of the disclosure, nor delineate any scope of the particular implementations of the disclosure or any scope of the claims. Its sole purpose is to present some concepts of the disclosure in a simplified form as a prelude to the more detailed description that is presented later.

Aspects of the present disclosure automatically determine properties of media items. Bayesian inference may be used to predict properties of media items in a match graph.

In an aspect of the disclosure, a method may include identifying a current media item to be processed and processing a plurality of labeled media items to identify labeled media items that include at least one respective segment that is similar to one of a plurality of segments of the current media item. The method may further include, for each of the plurality of segments of the current media item, generating a segment prediction value indicating a particular property associated with a corresponding segment of the current media item based on properties associated with respective labeled media items that each include a respective segment similar to the corresponding segment of the current media item. The method may further include calculating a media item prediction value for the current media item based on a generated segment prediction value of each of the plurality of segments of the current media item and causing the current media item to be processed based on the calculated media item prediction value.

Each of the labeled media items may be assigned a respective label; and each of the plurality of segments of the current media item may at least partially match one or more segments of the labeled media items. The generating, for each of the plurality of segments of the current media item, of the segment prediction value for the corresponding segment may be based on a plurality of parameters comprising at least one of length of the corresponding segment, length of the current media item, or length of the respective labeled media items that each include the respective segment similar to the corresponding segment of the current media item. The method may further comprise: determining that a first segment of the current media item matches a first corresponding segment of a first labeled media item; determining that a second segment of the current media item matches a second corresponding segment of a second labeled media item; determining that the first segment is a sub-segment of the second segment, wherein the second segment comprises the first segment and a third segment, wherein the generating of the segment prediction value for each of the plurality of segments comprises: generating a first segment prediction value indicating a first label for the first segment based on a first respective label of the first labeled media item and a second respective label of the second labeled media item; and generating a second segment prediction value indicating a second label for the third segment based on the second respective label of the second labeled media item, wherein the calculating of the media item prediction value is based on the generated first segment prediction value and the generated second segment prediction value. Causing the current media item to be processed may comprise one of the following: responsive to the calculated media item prediction value satisfying a first threshold condition, causing playback of the current media item via a media item platform to be prevented; responsive to the calculated media item prediction value satisfying a second threshold condition, causing the playback of the current media item via the media item platform to be allowed; and responsive to the calculated media item prediction value satisfying a third threshold condition, causing the current media item to be reviewed to generate a label indicating whether the playback of the current media item is to be allowed via the media item platform. The segment prediction value of each of the plurality of segments may be generated based on a plurality of parameters and one or more weights associated with one or more of the plurality of parameters. The method may further comprise adjusting the one or more weights based on the generated label for the current media item. The adjusting of the one or more weights comprises training, based on tuning input and target tuning output for the tuning input, a machine learning model to provide adjusted one or more weights; the tuning input comprises, for each of the plurality of segments of the current media item, length of the corresponding segment, length of the current media item, and length of the respective labeled media items that each include the respective segment similar to the corresponding segment of the current media item; and the tuning target output for the tuning input comprises the generated label for the current media item.

It will be appreciated that aspects can be implemented in any convenient form. For example, aspects may be implemented by appropriate computer programs which may be carried on appropriate carrier media which may be tangible carrier media (e.g. disks) or intangible carrier media (e.g. communications signals). Aspects may also be implemented using suitable apparatus which may take the form of programmable computers running computer programs arranged to implement the invention. Aspects can be combined such that features described in the context of one aspect may be implemented in another aspect.

BRIEF DESCRIPTION OF THE DRAWINGS

The present disclosure is illustrated by way of example, and not by way of limitation, in the figures of the accompanying drawings.

DETAILED DESCRIPTION

Figure 1:
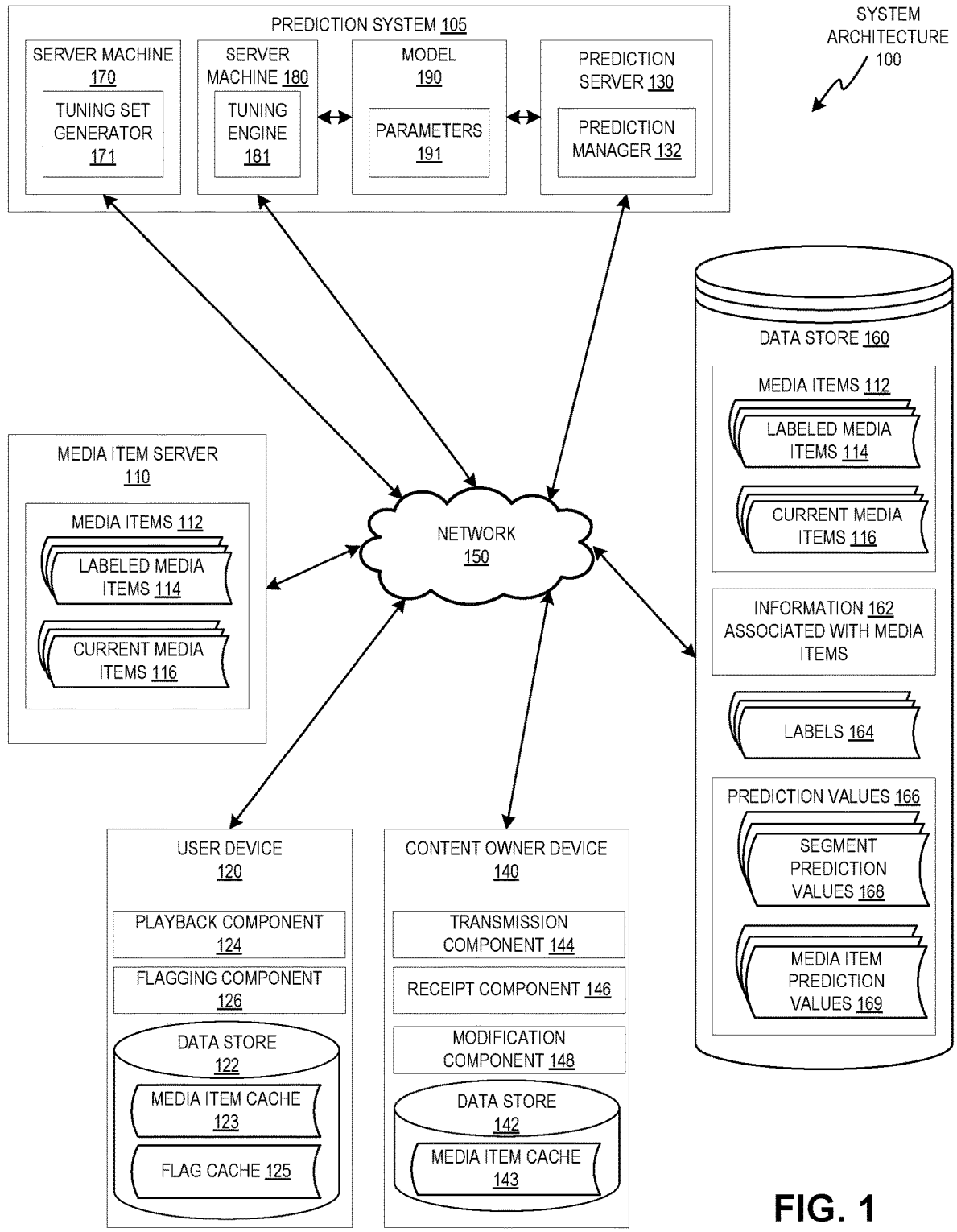
FIG. 1 is a block diagram illustrating an exemplary system architecture, in accordance with implementations of the disclosure.

Aspects and implementations of the disclosure are directed to using Bayesian inference to automatically determine properties of media items, for example to predict review decisions in a match graph. A server device may receive media items uploaded by user devices. The server device may cause the media items to be available for playback by these or other user devices via a media item platform. Responsive to a user flagging a media item (e.g., during playback) as having a type of content, the server device may submit the media item for review (e.g., manual review). During review, a user (e.g., administrator of the media item platform) may perform playback of the media item and may label the media item. Based on a label from the review, the server may associate a media item with a label. A label may indicate that the media item has a type of content that is inappropriate, infringes rights, has technical issues, has a rating, is suitable for advertisements, etc.

The server device may cause different actions to be performed with respect to the media item based on the label of the media item. For example, playback of a media item labeled as containing a type of content that is inappropriate (e.g., having a "negative review" label) can be prevented. Alternatively, playback of a media item labeled as not containing a type of content that is inappropriate (e.g., having a "positive review" label) can be allowed. In another example, based on the label of the media item, advertisements can be included during playback of the media item based on the label. In yet another example, a message can be transmitted to the user device that uploaded a media item labeled as having technical issues.

Newly uploaded media items may at least partially match labeled media items. Conventionally, each newly uploaded media item is typically flagged, submitted to manual review, and labeled based on the manual review (e.g., regardless if the media item matches labeled media items or not). Conventionally, the same amount of time and resources (e.g., processor overhead, bandwidth, power consumption, available human reviewers, etc.) may be required to review a first media item that at least partially matches a labeled media item as is required to review a second media item that does not at least partially match labeled media items. Reviewing media items prior to allowing the media items to be available for playback may require a long amount of time and may require a peak of required resources (e.g., high processor overhead, power consumption, and bandwidth). Allowing the media items to be available for playback prior to reviewing the media items may allow playback of media items that include issues and inappropriate content. Inaccurately labeling media items may require time and resources to correct.

Aspects of the present disclosure address the above-mentioned and other challenges by automatically determining properties of media items (e.g., using Bayesian inference to predict review decisions in a match graph). A processing device may identify a current media item (e.g., a newly uploaded media item) to be processed and may identify labeled media items (e.g., media items previously reviewed) to find labeled media items that include at least one respective segment that is similar to one of the segments of the current media item (e.g., a match graph may be created that includes the labeled media items that match at least a portion of the current media item). For each of the segments (e.g., segments that are similar to at least a portion of a labeled media item) of the current media item, the processing device may generate a segment prediction value that indicates a particular property associated with the corresponding segment of the current media item (e.g., based on properties associated with labeled media items that have a respective segment similar to the corresponding segment of the current media item, based on the match graph). The processing device may calculate a media item prediction value based on a generated segment prediction value of each of the segments of the current media item and may cause the current media item to be processed based on the calculated media item prediction value. For example, based on the media item prediction value, playback of the current media item via a media item platform may be allowed or prevented, or the current media item may be caused to be reviewed to generate a label for the current media item indicating whether the playback of the current media item is to be allowed.

Automatically generating properties for media items (e.g., predicting review decisions), as disclosed herein, is advantageous because it improves user experience and provides technological advantages. Many newly uploaded media items may have segments that are similar to labeled (e.g., previously reviewed) media items. By performing initial processing to select media items for further processing, assigning of properties to media items may be performed more efficiently and fewer media items may be required to be further processed. Processing newly uploaded media items based on calculated media item prediction values (e.g., based on labeled media items that at least partially match the newly uploaded media items) may therefore have decreased processor overhead, required bandwidth, and energy consumption compared to performing the same process to label any media item regardless if the media item at least partially matches previously labeled media items. Allowing or preventing playback of newly uploaded media items based on calculated media item prediction values may allow media items to be more quickly processed and may therefore provide a better user experience than providing all newly uploaded media items for playback and only preventing playback after a user has flagged a media item and a subsequent manual review labels the media item. Generating a media item prediction value for an uploaded media item may be advantageous for the user that uploaded the media item and advantageous for the users of the media item platform. For example, responsive to generating a media item prediction value indicating a technical issue, an indication based on the media item prediction value may be transmitted to the user that uploaded the media item alerting the user that the media item has a technical issue (e.g., recommending the media item be modified). In another example, responsive to generating media item prediction values for media items, the media items may be processed resulting in the media items being labeled (e.g., age-appropriateness, category, etc.) to improve search results and recommendations for users of the media item platform.

FIG. 1 illustrates an example system architecture 100, in accordance with an implementation of the disclosure. The system architecture 100 includes media item server 110, user device 120, prediction server 130, content owner device 140, a network 150, and a data store 160. The prediction server 130 may be part of a prediction system 105.

Media item server 110 may include one or more computing devices (such as a rackmount server, a router computer, a server computer, a personal computer, a mainframe computer, a laptop computer, a tablet computer, a desktop computer, etc.), data stores (e.g., hard disks, memories, databases, etc.), networks, software components, and/or hardware components. The media item server 110 may be used to provide a user with access to media items 112 (e.g., media items that have already been labeled ("labeled media items" 114), media items that are currently undergoing the labeling process ("current media items" 116), etc.). The media item server 110 may provide the media items 112 to the user (e.g., a user may select a media item 112 and download the media item 112 from the media item server 110 in response to requesting or purchasing the media item 112). Media item server 110 may be a part of a media item platform (e.g., a content hosting platform providing a content hosting service) that may allow users to consume, develop, upload, download, rate, flag, share, search for, approve of ("like"), dislike, and/or comment on media items 112. The media item platform may also include a website (e.g., a webpage) or application back-end software that may be used to provide a user with access to the media items 112.

Media item server 110 may host content, such as media items 112. Media items 112 may be digital content chosen by a user, digital content made available by a user, digital content developed by a user, digital content uploaded by a user, digital content developed by a content owner, digital content uploaded by a content owner, digital content provided by the media item server 110, etc. Examples of media items 112 include, and are not limited to, video items (e.g., digital video, digital movies, etc.), audio items (e.g., digital music, digital audio books, etc.), advertisements, a slideshow that switches slides over time, text that scrolls over time, figures that change over time, etc.

Media items 112 may be consumed via a web browser on the user device 120 or via a mobile application ("app") that can be installed on the user device 120 via an app store. The web browser or the mobile app may allow a user to perform one or more searches (e.g., for explanatory information, for other media items 112, etc.). As used herein, "application," "mobile application," "smart television application," "desktop application," "software application," "digital content," "content," "content item," "media," "media item," "video item," "audio item," "contact invitation," "game," and "advertisement" can include an electronic file that can be executed or loaded using software, firmware or hardware configured to present the media item 112 to an entity. In one implementation, the media item platform may store the media items 112 using the data store 160. Media items 112 may be presented to or downloaded by a user of user device 120 from media item server 110 (e.g., a media item platform such as a content hosting platform). Media items 112 may be played via an embedded media player (as well as other components) provided by a media item platform or stored locally. The media item platform may be, for example, an application distribution platform, a content hosting platform, or a social networking platform, and may be used to provide a user with access to media items 112 or provide the media items 112 to the user. For example, the media item platform may allow a user to consume, flag, upload, search for, approve of ("like"), dislike, and/or comment on media items 112. Media item server 110 may be part of the media item platform, be an independent system or be part of a different platform.

Network 150 may be a public network that provides user device 120 and content owner device 140 with access to media item server 110, prediction server 130, and other publically available computing devices. Network 150 may include one or more wide area networks (WANs), local area networks (LANs), wired networks (e.g., Ethernet network), wireless networks (e.g., an 802.11 network or a Wi-Fi network), cellular networks (e.g., a Long Term Evolution (LTE) network), routers, hubs, switches, server computers, and/or a combination thereof.

Data store 160 may be a memory (e.g., random access memory), a drive (e.g., a hard drive, a flash drive), a database system, or another type of component or device capable of storing data. Data store 160 may include multiple storage components (e.g., multiple drives or multiple databases) that may span multiple computing devices (e.g., multiple server computers). In some implementations, the data store 160 may store information 162 associated with media items, labels 164, or prediction values 166 (e.g., segment prediction values 168, media item prediction values 169). Each of the labeled media items 114 may have a corresponding label 164. Each of the labeled media items 114 may have been flagged (e.g., by a user during playback, via a machine learning model trained with input of images and output of a label). Each of the media items 112 may have corresponding information 162 (e.g., total length, length of each segment, media item identifier, etc.).

User device 120 and content owner device 140 may include computing devices such as personal computers (PCs), laptops, mobile phones, smart phones, tablet computers, netbook computers, network-connected televisions ("smart TV"), network-connected media players (e.g., Blu-ray player), a set-top-box, over-the-top (OTT) streaming devices, operator boxes, etc.

Each user device 120 may include an operating system that allows users to perform playback of media items 112 and flag media items 112. The media item 112 may be presented via a media viewer or a web browser. A web browser can access, retrieve, present, and/or navigate content (e.g., web pages such as Hyper Text Markup Language (HTML) pages, digital media items, text conversations, notifications, etc.) served by a web server. An embedded media player (e.g., a Flash® player or an HTML5 player) may be embedded in a web page (e.g., providing information about a product sold by an online merchant) or be part of a media viewer (a mobile app) installed on user device 120. In another example, the media item 112 may presented via a standalone application (e.g., a mobile application or app) that allows users to view digital media items (e.g., digital videos, digital audio, digital images, etc.).

The user device 120 may include one or more of a playback component 124, a flagging component 126, and a data store 122. In some implementations, the one or more of the playback component 124 or flagging component 126 may be provided by a web browser or an application (e.g., mobile application, desktop application) executing on the user device 120.

Data store 122 may be a memory (e.g., random access memory), a drive (e.g., a hard drive, a flash drive), a database system, or another type of component or device capable of storing data. Data store 122 may include multiple storage components (e.g., multiple drives or multiple databases) that may span multiple computing devices (e.g., multiple server computers). The data store 122 may include a media item cache 123 and a flag cache 125.

Playback component 124 may provide playback of a media item 112 via the user device 120. The playback of the media item 112 may be responsive to playback component 124 receiving user input (e.g., via a graphical user interface (GUI) displayed via the user device) requesting playback of the media item 112 and transmitting the request to the media item server 110. In some implementations, the media item server 110 may stream the media item 112 to the user device 120. In some implementations, the media item server 110 may transmit the media item 112 to the user device 120. The playback component 124 may store the media item 112 in the media item cache 123 for playback at a later point in time (e.g., subsequent playback regardless of connectivity to network 150).

Flagging component 126 may receive user input (e.g., via the GUI, during playback of the media item 112) to flag the media item 112. The media item 112 may be flagged for one or more types of content. The user input may indicate the type of content (e.g., by selecting the type of content from a list). Based on the user input, flagging component 126 may flag the media item 112 as having a type of content that is inappropriate (e.g., includes one or more of sexual content, violent or repulsive content, hateful or abusive content, harmful dangerous acts, child abuse, promoting terrorism, being spam or misleading, etc.), infringes rights, has technical issues (e.g., issues with captions, etc.), has a rating (e.g., age-appropriateness rating, etc.), is suitable for advertisements, etc. Flagging component 126 may transmit an indication that the media item 112 has been flagged to one or more of prediction system 105, prediction server 130, data store 160, etc.

Responsive to being flagged, the media items 112 may be labeled (e.g., via manual review) to generate labeled media items 114. Information 162 associated with the labeled media items 114, and the labels 164 may be stored in the data store 160 together with the labeled media items 114. Alternatively, the labeled media items 114 may be stored in a separate data store and be associated with the information 162 and the labels 164 via media item identifiers.

The content owner device 140 may include a transmission component 144, a receipt component 146, a modification component 148, and a data store 142.

Data store 142 may be a memory (e.g., random access memory), a drive (e.g., a hard drive, a flash drive), a database system, or another type of component or device capable of storing data. Data store 142 may include multiple storage components (e.g., multiple drives or multiple databases) that may span multiple computing devices (e.g., multiple server computers). The data store 142 may include a media item cache 143.

Transmission component 144 may receive a media item 112 created by, modified by, to be uploaded by, or associated with the content owner corresponding to the content owner device 140. The transmission component 144 may store the media item 112 in the media item cache 143. The transmission component 144 may transmit (e.g., upload) the media item 112 to the media item server 110 (e.g., in response to content owner input to upload the media item 112).

The receipt component 146 may receive an indication based on the media item prediction value 169 (e.g., generated by the prediction manager 132) from the prediction server 130. The receipt component 146 may store the indication in the data store 142.

The modification component 148 may modify the media item 112 based on the indication that is based on the media item prediction value 169. For example, responsive to an indication based on the media item prediction value 169 indicating that content of the media item 112 is inappropriate or has technical issues (e.g., errors in the captions, etc.), the modification component 148 may cause the content of the media item 112 to be modified (e.g., remove the inappropriate content, fix the technical issues). In some implementations, to cause the content to be modified, the modification component 148 may provide the indication or a recommendation of how to modify the content via the GUI to the content owner. In some implementations, to cause the content to be modified, the modification component 148 may modify the content (e.g., fix the technical issues, remove the inappropriate content, etc.) automatically.

Prediction server 130 may be coupled to user device 120 and content owner device 140 via network 150 to facilitate predicting review decisions of media items 112. In one implementation, prediction server 130 may be part of the media item platform (e.g., the media item server 110 and prediction server 130 may be part of the same media item platform). In another implementation, prediction server 130 may be an independent platform including one or more computing devices such as a rackmount server, a router computer, a server computer, a personal computer, a mainframe computer, a laptop computer, a tablet computer, a desktop computer, etc., and may provide a review decision prediction service that can be used by the media item platform and/or various other platforms (e.g., a social network platform, an online news platform, a messaging platform, a video conferencing platform, an online meeting platform, etc.).

Prediction server 130 may include a prediction manager 132. According to some aspects of the disclosure, the prediction manager 132 may identify a current media item 116 (e.g., newly uploaded media item) to be processed (e.g., to be automatically evaluated without user input based, for example, on an indication provided by flagging component 126) and may process labeled media items 114 to find labeled media items 114 that include at least one respective segment that is similar to one of the segments of the current media item (e.g., generate a match graph of the labeled media items 114). For each of the segments of the current media item 116 (e.g., that at least partially match a labeled media item 114), the prediction manager 132 may generate a segment prediction value 168 indicating a particular property associated with a corresponding segment of the current media item 116 (e.g., based on properties associated with respective labeled media items 114 that teach include a respective segment similar to the corresponding segment of the current media item 116, based on the match graph). The prediction manager 132 may calculate a media item prediction value 169 for the current media item 116 based on a generated segment prediction value 168 of each of the segments of the current media item 116 and may process the current media item 116 based on the calculated media item prediction value 169. In some implementations, the prediction manager (e.g., via a trained machine learning model 190, without a trained machine learning model 190) may use Bayesian inference to predict review decisions (e.g., media item prediction values 169) in a match graph (e.g., based on labeled media items 114 that at least partially match the current media item 116, based on table 400A of FIG. 4A, etc.).

Responsive to the media item prediction value 169 (e.g., indicating that the current media item 116 has content that is inappropriate or has technical issues), the prediction manager 132 may cause the current media item 116 to be prevented from being available for playback via the media item platform. The prediction manager 132 may transmit an indication based on the media prediction value 169 to the media item platform (or any other platform) or directly to the content owner device 140 indicating determined properties of the current media item 116. The content owner device 140 may receive the indication (e.g., from the media item platform or from the prediction manager 132), cause the current media item 116 to be modified based on the indication, and re-upload the modified current media item (e.g., to the media item server 110, prediction server 130, or the media item platform).

In some implementations, the prediction manager 132 may use a trained machine learning model 190 to determine the media item prediction value 169. The prediction system 105 may include one or more of prediction server 130, server machine 170, or server machine 180. The server machines 170-180 may be one or more computing devices (such as a rackmount server, a router computer, a server computer, a personal computer, a mainframe computer, a laptop computer, a tablet computer, a desktop computer, etc.), data stores (e.g., hard disks, memories, databases), networks, software components, or hardware components.

Server machine 170 includes a tuning set generator 171 that is capable of generating tuning data (e.g., a set of tuning inputs and a set of target outputs) to train a machine learning model. Server machine 180 includes a tuning engine 181 that is capable of training a machine learning model 190 using the tuning data from tuning set generator 171. The machine learning model 190 may be trained using the tuning inputs 210 and target outputs 220 (e.g., target tuning outputs) described herein (see FIGS. 2 and 3C). The trained machine learning model 190 may then be used to determine a media item prediction value 169. The machine learning model 190 may refer to the model artifact that is created by the tuning engine 181 using the tuning data that includes tuning inputs and corresponding target outputs (correct answers for respective tuning inputs). Patterns in the tuning data can be found that map the tuning input to the target output (the correct answer), and the machine learning model 190 is provided that captures these patterns. The machine learning model 190 may include parameters 191 (e.g., k, f, g, configuration parameters, hyperparameters, etc.) that may be tuned (e.g., associated weights may be adjusted) based on subsequent labeling of current media items 116 for which media item prediction values 169 were determined. In some implementations, the parameters 191 include one or more of k, f, or g as described below. In some implementations, the parameters include at least one of length of a corresponding segment of a current media item 116, length of the current media item 116, or length of the respective labeled media items 114 (e.g., that each include the respective segment similar to the corresponding segment of the current media item 116).

Prediction manager 132 may determine information associated with the current media item 116 (e.g., length of the current media item 116, length of the segments of the current media item 116 that are similar to a respective segment of labeled media items 114) and information associated with the labeled media item 114 (e.g., length of the labeled media items 114) and may provide the information to a trained machine learning model 190. The trained machine learning model 190 may produce an output and prediction manager 132 may determine a media item prediction value 169 from the output of the trained machine learning model. For example, the prediction manager 132 may extract a media item prediction value 169 from the output of the trained machine learning model 190 and may extract confidence data from the output that indicates a level of confidence that the current media item 116 contains the type of content indicated by the media item prediction value 169 (e.g., a level of confidence that media item prediction value 169 accurately predicts a manual review decision).

In an implementation, confidence data may include or indicate a level of confidence that the current media item 116 has particular properties (e.g., contains a type of content). In one example, the level of confidence is a real number between 0 and 1 inclusive, where 0 indicates no confidence the current media item 116 has a particular type of content and 1 indicates absolute confidence the current media item 116 has the particular type of content.

Also as noted above, for purpose of illustration, rather than limitation, aspects of the disclosure describe the training of a machine learning model 190 and use of a trained machine learning model 190 using information 162 associated with media items 112. In other implementations, a heuristic model or rule-based model is used to determine a media item prediction value 169 for a current media item 116. It may be noted that any of the information described with respect to tuning inputs 210 of FIG. 2 may be monitored or otherwise used in the heuristic or rule-based model.

It should be noted that in some other implementations, the functions of server machine 170, server machine 180, prediction server 130, or media item server 110 may be provided by a fewer number of machines. For example, in some implementations server machines 170 and 180 may be integrated into a single machine, while in some other implementations server machine 170, server machine 180, and prediction server 130 may be integrated into a single machine. In addition, in some implementations one or more of server machine 170, server machine 180, and prediction server 130 may be integrated into the media item server 110.

In general, functions described in one implementation as being performed by the media item server 110, server machine 170, server machine 180, or prediction server 130 can also be performed on the user device 120 in other implementations, if appropriate. For example, the media item server 110 may stream the media item 112 to the user device 120 and may receive user input indicating flagging of the media item 112.

In general, functions described in one implementation as being performed on the user device 120 can also be performed by the media item server 110 or prediction server 130 in other implementations, if appropriate. For example, the media item server 110 may stream the media item 112 to the user device 120 and may receive the flagging of the media item 112.

In addition, the functionality attributed to a particular component can be performed by different or multiple components operating together. The media item server 110, server machine 170, server machine 180, or prediction server 130 can also be accessed as a service provided to other systems or devices through appropriate application programming interfaces (API), and thus is not limited to use in websites and applications.

In implementations of the disclosure, a "user" may be represented as a single individual. However, other implementations of the disclosure encompass a "user" being an entity controlled by a set of users and/or an automated source. For example, a set of individual users federated as a community in a social network may be considered a "user." In another example, an automated consumer may be an automated ingestion pipeline of the application distribution platform.

Although implementations of the disclosure are discussed in terms of a media item server 110, prediction server 130, and a media item platform, implementations may also be generally applied to any type of platform providing content and connections between users.

Further to the descriptions above, a user may be provided with controls allowing the user to make an election as to both if and when systems, programs, or features described herein may enable collection of user information (e.g., information about a user's social network, social actions or activities, profession, a user's preferences, or a user's current location), and if the user is sent content or communications from a server (e.g., media item server 110 or prediction server 130). In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over what information is collected about the user, how the information is used, and what information is provided to the user.

Figure 2:
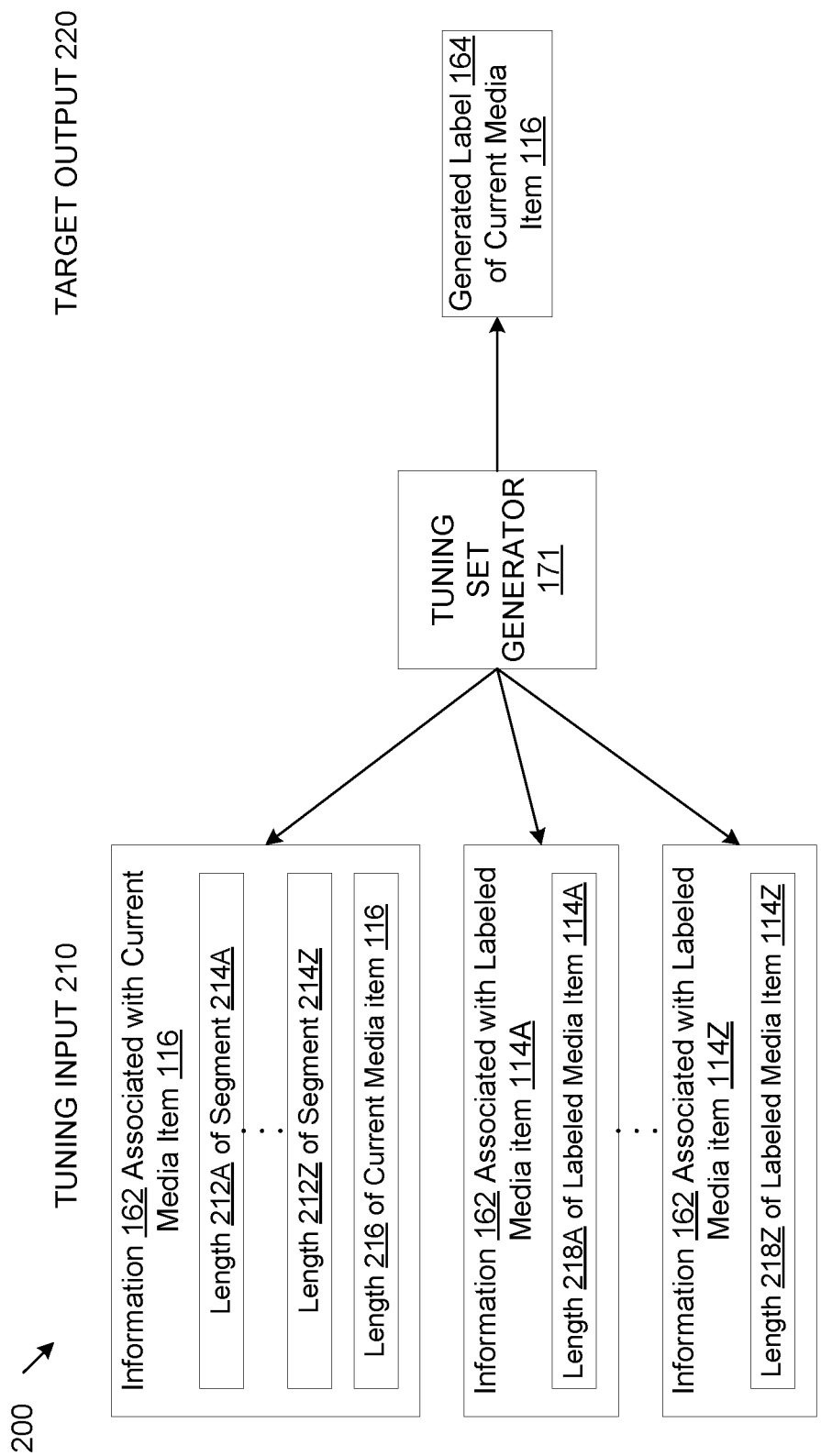
FIG. 2 is an example tuning set generator to create tuning data for a machine learning model, in accordance with implementations of the disclosure.

FIG. 2 is an example tuning set generator to create tuning data for a machine learning model using information, in accordance with an implementation of the disclosure. System 200 shows tuning set generator 171, tuning inputs 210, and target output 220 (e.g., target tuning output). System 200 may include similar components as system 100, as described with respect to FIG. 1. Components described with respect to system 100 of FIG. 1 may be used to help describe system 200 of FIG. 2.

In implementations, tuning set generator 171 generates tuning data that includes one or more tuning inputs 210, and one or more target outputs 220. The tuning data may also include mapping data that maps the tuning inputs 210 to the target outputs 220. Tuning inputs 210 may also be referred to as "features," "attributes," or "information." In some implementations, tuning set generator 171 may provide the tuning data in a tuning set, and provide the tuning set to the tuning engine 181 where the tuning set is used to train the machine learning model 190. Some implementations of generating a tuning set may further be described with respect to FIG. 3C.

In one implementation, tuning inputs 210 may include information 162 that is associated with current media item 116 and one or more labeled media items 114 that include at least one respective segment that is similar to one of the segments of the current media item 116. For current media item 116, the information 162 may include length 212A of segment 214A of current media item 116, length 212B of segment 214B of current media item 116, etc. (hereinafter length 212 of segment 214) and length 216 of the current media item 116. For each labeled media item 114, the information 162 may include length 218 of the labeled media item 114.

In implementations, target outputs 220 may include a generated label 164 of the current media item 116. In some implementations, the generated label 164 may have been generated by manual review of the current media item 116. In some implementations, the generated label 164 may have been generated by automatic review of the current media item 116.

In some implementations, subsequent to generating a tuning set and training the machine learning model 190 using the tuning set, the machine learning model 190 may be further trained (e.g., additional data for a tuning set) or adjusted (e.g., adjusting weights of parameters 191) using generated labels 164 for current media items 116.

FIGS. 3A-D depict flow diagrams for illustrative examples of methods 300, 320, 340, and 360 for predicting review decisions of media items, in accordance with implementations of the disclosure. Methods 300, 320, 340, and 360 are example methods from the perspective of the prediction system 105 (e.g., one or more of server machine 170, server machine 180, or prediction server 130) (e.g., and/or media item platform or media item server 110). Methods 300, 320, 340, and 360 may be performed by processing devices that may include hardware (e.g., circuitry, dedicated logic), software (such as is run on a general purpose computer system or a dedicated machine), or a combination of both. Methods 300, 320, 340, and 360 and each of their individual functions, routines, subroutines, or operations may be performed by one or more processors of the computer device executing the method. In certain implementations, each of methods 300, 320, 340, and 360 may be performed by a single processing thread. Alternatively, each of methods 300, 320, 340, and 360 may be performed by two or more processing threads, each thread executing one or more individual functions, routines, subroutines, or operations of the method.

For simplicity of explanation, the methods of this disclosure are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term "article of manufacture," as used herein, is intended to encompass a computer program accessible from any computer-readable device or storage media. For example, a non-transitory machine-readable storage medium may store instructions which, when executed, cause a processing device (e.g., of prediction system 105, media item server 110, user device 120, prediction server 130, content owner device 140, server machine 170, server machine 180, media item platform, etc.) to perform operations including methods disclosed within. In another example, a system includes a memory to store instructions and a processing device communicably coupled to the memory, the processing device to execute the instructions to perform methods disclosed within. In one implementation, methods 300, 320, 340, and 360 may be performed by prediction system 105 of FIG. 1.

Figure 3A:
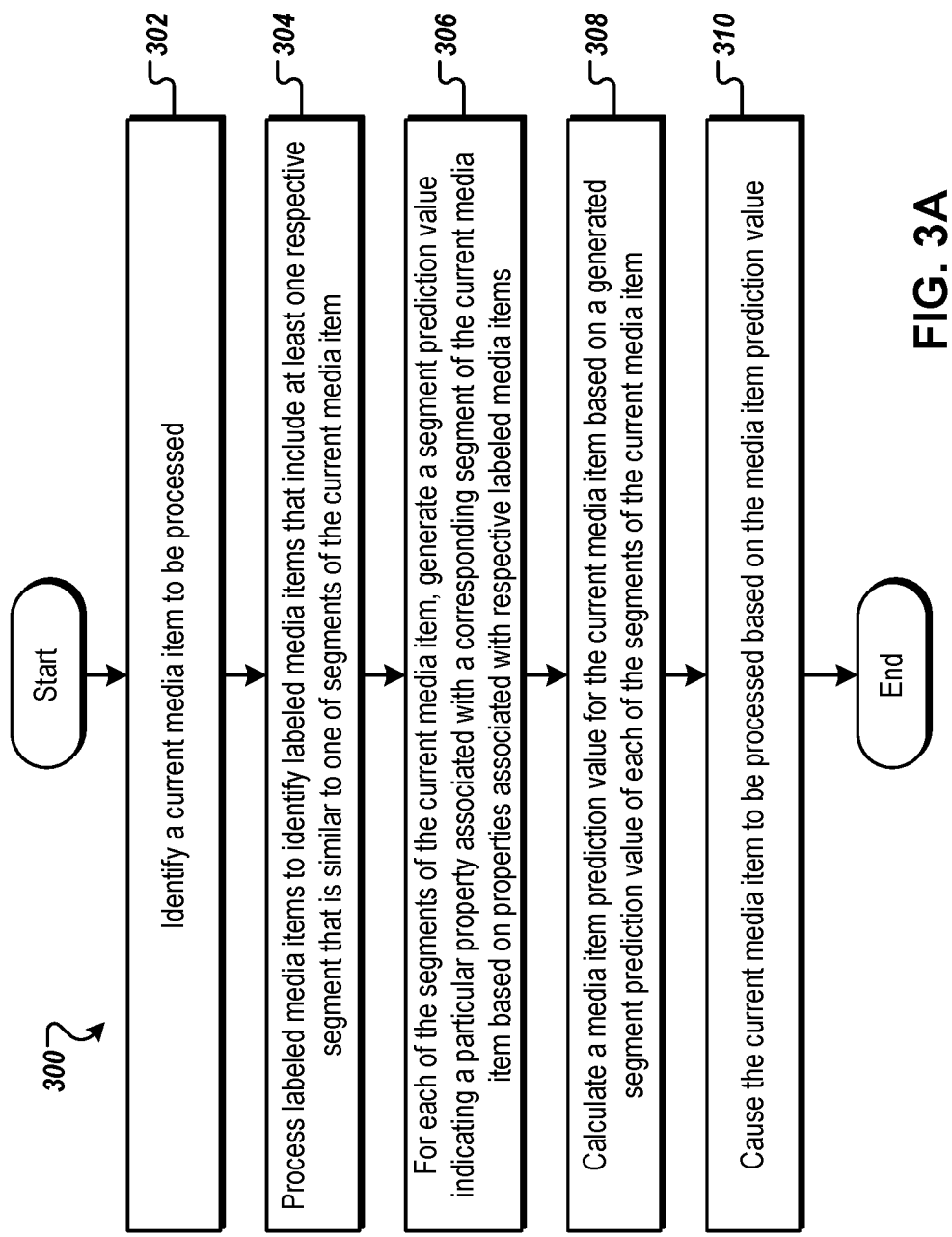
FIGS. 3A-D are flow diagrams illustrating example methods of predicting review decisions of media items, in accordance with implementations of the disclosure.

Referring to FIG. 3A, method 300 may be performed by one or more processing devices of a prediction server 130 for predicting review decisions of media items. Method 300 may be performed by an application or a background thread executing on one or more processing devices on the prediction server 130. In some implementations, one or more portions of method 300 may be performed by one or more of prediction system 105, media item server 110, prediction server 130 (e.g., prediction manager 132), or media item platform.

At block 302, the processing device identifies a current media item 116 to be processed. For example, the current media item 116 may have been uploaded by a content owner device 140 to be made available for playback via a media item platform. In some implementations, the current media item 116 has been previously reviewed (e.g., be associated with a label 164) and the current media item 116 is identified as to undergo further processing (e.g., via method 300) to update or confirm the label 164. In some implementations, the media item 116 has been flagged (e.g., by a user device 120 during playback, by a machine learning model trained with images and labels 164) and the current media item 116 is identified to undergo further processing (e.g., via method 300). In some implementations, the current media item 116 is the next media item in a queue of media items to be processed.

At block 304, the processing device processes labeled media items 114 to identify labeled media items that include at least one respective segment that is similar to (e.g., matches, is substantially the same as) one of segments of the current media item 116. For example, frames of the current media item 116 may be compared to frames of labeled media items 114 (e.g., frames of the current media item 116 are compared against an index of frames of labeled media items 114). The processing device may determine that a first segment of a labeled media item 114 and a second segment of the current media item 116 are similar (e.g., matching, being substantially similar to) in spite of one of the segments having a border or frame, and/or being inverted, and/or being sped up or slowed down, and/or having static, and/or having different quality, etc. The processing device may determine that at least a portion of a frame or audio segment of the current media item 116 matches at least a portion of a frame or audio segment of a labeled media item 114. The processing device may identify segments of the current media item 116, where each of the segments at least partially matches one or more segments of the labeled media items 114. The processing device may divide current media item 116 (V) into segments (S) (e.g., $V=S_1+ \ldots +S_k$), where adjacent segments belong to different clusters or to no cluster.

At block 306, the processing device, for each of the segments of the current media item 116, generates a segment prediction value 168 indicating a particular property associated with a corresponding segment of the current media item 116 based on properties associated with respective labeled media items 114. The processing device may combine positive predictions (e.g., the segment is similar to one or more labeled media items having a "positive review" label) and negative predictions (e.g., the segment is also similar to one or more labeled media items having a "negative review" label). Determining a segment is similar to one or more labeled media items having a "positive review" label (labeled as "good") and one or more media items having a "negative review" label (labeled as "bad") may be referred to determining a match graph for the segment. Bayesian inference may be used to predict review decisions (e.g., media item prediction value 169 based on segment prediction values 168) of a current media item 116 in a match graph (e.g., that has one or more segments that are similar to respective segments of labeled media items 114).

For a media item (V), the following values may be used (e.g., based on table 400A of FIG. 4A):

$H_V^B$—Hypothesis that video V should have a "negative review" label $P(H_V^B)$—Prior Probability of $H_V^B$~(20+4)/(20+4+75+1)=24%

$R_V^B$—Event that video V has a "negative review" label $P(R_V^B)$—Marginal likelihood of $R_V^B$~21%

$P(R_V^B|H_V^B)$—Probability that V has a "negative review" label under Hypothesis that the V should have a "negative review" label~20/24≈83%

$P(H_V^B|R_V^B)$—Probability that V should have a "negative review" label assuming it has a "negative review" label~20/21≈95%

These values (e.g., through Bayes' formula) may be connected by the following equation:

$$P(H_V^B|R_V^B)=P(H_V^B)*P(R_V^B|H_V^B)/P(R_V^B)$$

This equation may be verified by using the values in table 400A:

20/21=24/100*20/24*100/21

Method 300 may predict a media item prediction value 169 (e.g., predict whether a media item should have a "positive review" label or a "negative review" label) based on labels 164 (events E) of labeled media items 114 (e.g., previous reviewer decisions, represented as events E). If a media item contains disjoint segments $S_1, \ldots, S_k$, the probability that the media item V should have a "positive review" label is the product of the probabilities of the segments:

$$P(H_V^G|E)=\Pi_{i=1}^k P(H_{S_i}^G|E).$$

A media item 112 is to be labeled as not containing a type of content only if every segment of the media item 112 does not contain the type of content (e.g., a media item 112 has a "positive review" label only if every part of it has a "positive review" label). This equation holds also if there is no evidence:

$$P(H_{S_i}^G)=P(H_V^G)^{|S_i|/|V|}=(76/100)^{|S_i|/|V|}=k^{|S_i|/|V|},$$

where $k=P(H_V^G)=76\%$ is a constant (e.g., a parameter 191, a probability that an arbitrary media item should have a "negative review" label in the absence of information). Under the assumption that the (prior) probability of a media item 112 containing a type of content (e.g., the media item 112 having a "negative review" label) is independent of the length of the media item 112, the (prior) probability that a segment of the current media item 116 (e.g., a media item 112 under consideration) contains the type of content (e.g., has a "negative review" label) is exponentially decreasing with the fractional length of the segment. The shorter a segment of a current media item 116 (e.g., that matches a respective segment of a labeled media item 114 having a "negative review" label) is, the lower the probability may be that the current media item 116 should have a "negative review" label.

A labeled media item 116 that is labeled as containing a type of content (e.g., having a "negative review" label) may be referred to as media item A and a labeled media item 116 that is labeled as not containing a type of content (e.g., has a "positive review" label) may be referred to as media item O.

A segment (S) of current media item 116 (V) may be similar to (e.g., match) a labeled media item 114 (A) that has been labeled as containing a type of content (e.g., both V and A contain S). The relationship between $P(H_S^G)$ and $P(H_S^G|R_A^B)$ may be expressed by estimating the impact of $R_A^B$ on $P(H_S^G)$ using the impact of $R_A^B$ on $P(H_A^G)$. The impact of $R_A^B$ on $P(H_A^G)$ may be expressed by the following equation:

$$P(H_A^G|R_A^B)=P(H_A^G)*P(R_A^B|H_A^G)/P(R_A^B)=P(H_A^G)*(1/76)/(21/100)=P(H_A^G)*6.3\%.$$

The impact of $R_A^B$ on $P(H_A^G)$ may be a multiplicative factor of about 6.3% (using the values in table 400A). This estimation of the impact is likely to be accurate if S covers all of A. If S does not cover all of A, the fraction of A being covered by S may be taken into account as an exponent.

Responsive to S being split into two segments $S_1$ and $S_2$, both of which match different parts of A, the resulting probabilities will be multiplied, so the factor may be used as an exponent, as shown in the following equation:

$$P(H_S^G|R_A^B)=P(H_S^G)*f^{|S|/|A|},$$

where f is the constant factor $P(R_A^B|H_A^G)/P(R_A^B)$. In some implementations, f is an impact factor and is specific to labeled media item (A). For example, an 85% match has an impact of 9.5%, a 50% match 25%, a 10% match 76% etc.

Responsive to a labeled media item 114 being labeled as not containing a type of content (e.g., has a "positive review" label), all segments of the labeled media item 114 also do not contain the type of content (e.g., have a "positive review" label as well). For a long media item 112, it may be unlikely that a reviewer would consider all of media item 112 (e.g., in the absence of signals indicating that the reviewer should consider all of the media item 112). The impact of $R_O^G$ on $P(H_S^B)$ may be shown in the following equation:

$$P(H_S^B|R_O^G)=P(H_S^B)*g^{|S|/|O|},$$

where $g=P(R_O^G|H_O^B)/P(R_O^G)=(4/24)/(76/100)=22\%$.

The constant g may be specific to a labeled media item (O). The probability (x) of a segment (S) not containing a type of content based on being similar to a segment of a labeled media item 114 labeled as containing the type of content (e.g., x is the probability that S should have a "positive review" label based on the "negative review" labels) may be expressed by the following equation:

$$x=P(H_S^G|R_{A_1}^B,\ldots,R_{A_n}^B)=P(H_S^G)*f^{|S|*\Sigma_{i=1}^n 1/|A_i|}$$

The probability (y) of a segment (S) containing a type of content based on being similar to a segment of a labeled media item 114 labeled as not containing the type of content (e.g., y is the probability that S should have a "negative review" label based on the "positive review" labels) may be expressed by the following equation:

$$y=P(H_S^B|R_{O_1}^G,\ldots,R_{O_m}^G)=P(H_S^B)*g^{|S|*\Sigma_{i=1}^m 1/|O_i|}$$

Figure 4A:
FIGS. 4A-B are tables for predicting review decisions of media items, in accordance with implementations of the disclosure.
Figure 4B:

These probabilities may be combined based on table 400B of FIG. 4B. There are two independent pieces of evidence and there are four possibilities, two of which (e.g., shaded cells of table 400B) that may be ruled out.

The resulting probability of the segment (S) not containing the type of content (e.g., having a particular property associated with a label 164, resulting probability that S should have a "positive review" label) may be shown by the following equation:

$$P(H_S^G|R^B\ldots\&R^G\ldots)=\frac{x*(1-y)}{x*(1-y)+(1-x)*y}=C(x,y).$$

If the predictions are the same (i.e., if x=1−y), the equation reduces to $x^2/(x^2+(1-x)^2)$ (e.g., a sigmoid function). If y=½, the equation reduces (½x)/(½x+½(1−x))=x. If x=½, the equation reduces to 1−y.

In the absence of a segment (S) being similar to a labeled media item 114 labeled as not containing the type of content (e.g., in the absence of "positive review" labels), the prior probability of the hypothesis that segment (S) contains the type of content (e.g., should have a "negative review" label) may be one half (e.g., $P(H_S^B)=½$). If $P(H_S^B)=½$ and the segment (S) is only similar to labeled media items 114 labeled as not containing the type of content (e.g., there are only "positive review" labels), then $x=P(H_S^G)$ and $y=½g^{|S|*\Sigma_{i=1}^m 1/|O_i|}$ and $C(P(H_S^G), ½g^{|S|*\Sigma_{i=1}^m 1/|O_i|})$ is very close to $1-P(H_S^B)*g^{|S|*\Sigma_{i=1}^m 1/|O_i|}$ if $P(H_S^G)$ is close to 100% (e.g., if $P(H_S^G)$ is >95%, then the error is less than 1%).

In some implementations, for each segment $S_i$, having reviews $R_{A_1}^B,\ldots,R_{A_n}^B$ and $R_{O_1}^G,\ldots,R_{O_m}^G$, x and y are computed as follows:

$$x=P(H_S^G|R_{A_1}^B,\ldots,R_{A_n}^B)=k^{\frac{|S_i|}{|V|}}*f^{|S|*\frac{\Sigma_{i=1}^n 1}{|A_i|}}=k^{\frac{|S_i|}{|V|}}*\prod_{i=1}^n f_i^{\frac{|S|}{|A_i|}}$$

$$y=P(H_S^B|R_{O_1}^G,\ldots,R_{O_m}^G)=\frac{1}{2}*g^{|S|*\Sigma_{i=1}^n 1/|O_i|}=\frac{1}{2}*\prod_{i=1}^m g_i^{|S|/|O_i|},$$

where $k=P(H_V^G)=76\%$, $f=P(R_A^B|H_A^G)/P(R_A^B)=6.3\%$, $g=P(R_O^G|H_O^B)/P(R_O^G)=22\%$, (the factor ½ in y comes from it being neutral to combining "positive review" labels and "negative review" labels)

and let $$P(H_S^G|E)=\frac{x*(1-y)}{x*(1-y)+(1-x)*y}$$

If there are no reviews, this reduces to $k^{|S_i|/|V|}$. In other implementations, x and y probabilities based on "positive review" labels and "negative review" labels) may be combined in other manners.

At block 308, the processing device calculates a media item prediction value 169 (e.g., combined probability) for the current media item 116 based on a generated segment prediction value 168 of each of the segments of the current media item 116. The segment prediction values 168 may be combined into a media item prediction value 169 for the whole current media item 116 by the following equation:

$$P(H_V^G|E)=\Pi_{i=1}^k P(H_{S_i}^G|E)$$

In some implementations, the media item prediction value 169 may indicate the probability that the current media item 116 does not contain the type of content or property (e.g., probability that should have a "positive review" label). For example, a media item prediction value 169 may indicate the current media item 116 has a 90% probability of not containing the type of content or property. In some implementations, the segment prediction values 168 and media item prediction value 169 may be scores indicating the relative probability of containing the type of content or property. For example, a first media item prediction value of a first current media item may indicate a larger final score and a second media item prediction value of a second current media item may indicate a smaller final score. The relatively larger final score indicates the first current media item is more likely to contain the type of content than the second current media item. In some implementations, the segment prediction values 168 are multiplied together to calculate the media item prediction value 169. In some implementations, the segment prediction values 168 are combined using one or more other operations (e.g., instead of multiplication, in combination with multiplication, etc.). In some implementations, the segment prediction values 168 are combined via one or more operations (e.g., multiplication, etc.) with a previous prediction value for the current media item 116 (e.g., a probability or score generated by a previous review of the current media item 116).

In an example, at block 304, processing device may determine that a first segment (e.g., seconds 0-15) of the current media item 116 matches a first corresponding segment of a first labeled media item 114A, a second segment (e.g., seconds 0-30) of the current media item 116 matches a second corresponding segment of a second labeled media item 114B, and the first segment is a sub-segment of the second segment. The second segment of the current media item 116 may include the first segment and a third segment of the current media item 116. In block 306, the processing device may process the first segment (e.g., generate a first segment prediction value indicating a first label for the first segment) based on a first respective label 164A of the first labeled media 114A item and a second respective label 164B of the second labeled media item 114B. In block 306, the processing device may process the second segment (e.g., generate a second segment prediction value indicating a second label for the first segment) based on a second respective label 164B of the second labeled media item 114B. In block 308, the processing device may calculate the media item prediction value 169 based on the generated first segment prediction value 168 and the generated second segment prediction value 168.

Figure 3B:
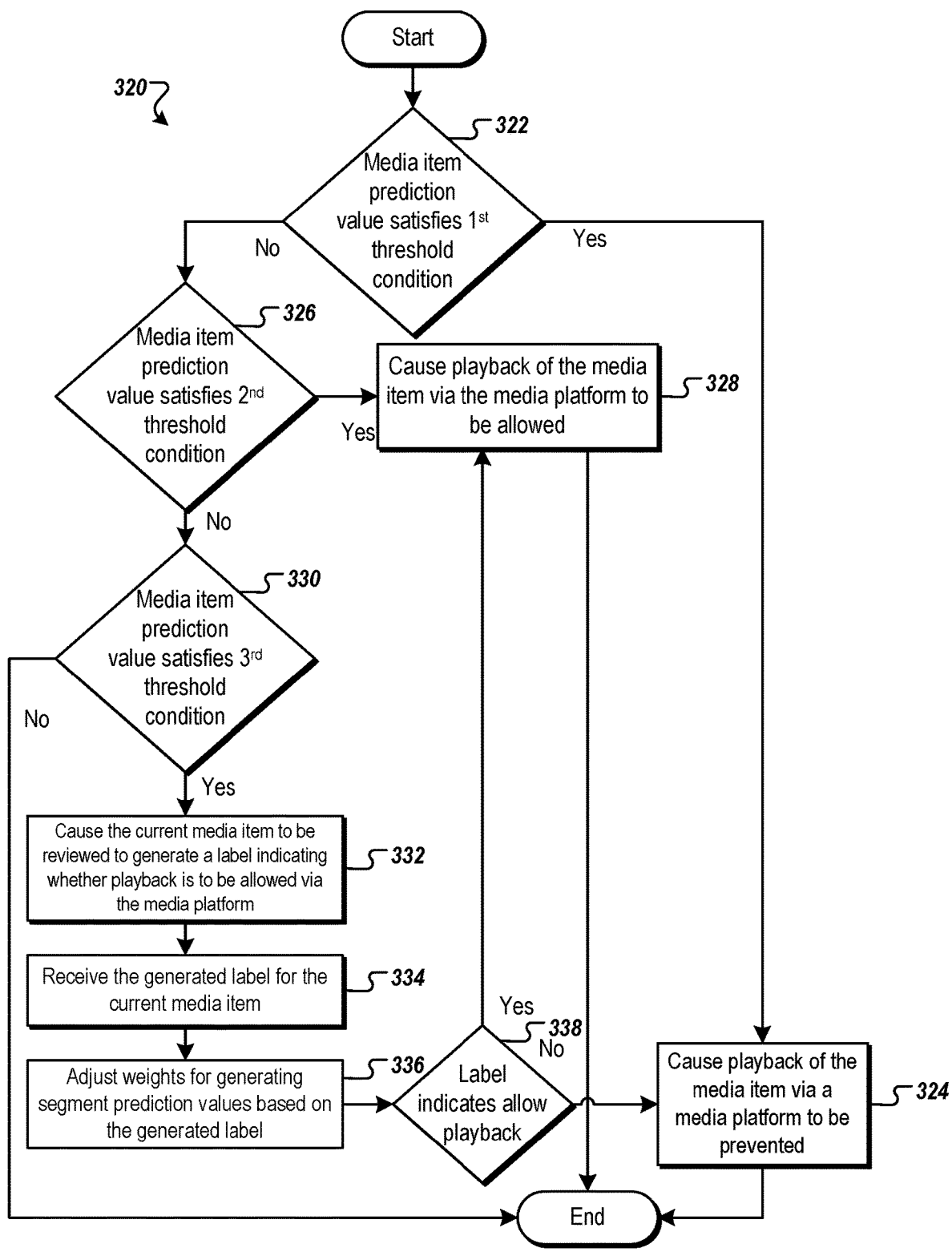

At block 310, the processing device causes the current media item 116 to be processed based on the media item prediction value 169. For example, the processing device can provide the media item prediction value 169 (or information related to the media item prediction value 169) to the media item platform to initiate the processing of the current media item 116. Alternatively, the processing device can itself perform the processing of the current media item 116 based on the media item prediction value 169. In some implementations, the processing of the current media item 116 includes applying a policy (e.g., prevent playback, apply playback, send to review, etc.) to the current media item 116 based on the media item prediction value 169. In some implementations, the processing of the current media item 116 based on the media item prediction value 169 is illustrated by FIG. 3B. In some implementations, the processing device may cause one or more media items (e.g., advertisements, interstitial media items) to be associated with the playback of the current media item 116 (e.g., cause playback of an additional media item in conjunction with playback of the current media item 116). In some implementations, the processing device may cause an indication to be transmitted to the content owner device 140 associated with the current media item 116 based on the media item prediction value 169 (e.g., indicating issues with the current media item 116, etc.). In some implementations, the processing device may modify or cause to be modified the current media item 116 based on the media item prediction value 169. In some implementations, the processing device associates a label 164 with the current media item 116 based on the media item prediction value 169.

In some implementations, the processing device may send the current media item 116 for review (e.g., manual review) and may receive one or more review decisions (e.g., manual review decisions). The processing device may cause k, $f_i$, and $g_i$ (e.g., parameters 191) to be tuned based on the review decisions (e.g., via re-training, via a feedback loop). In some implementations, the tuning optimizes the area under the curve (AUC). In some implementations, the tuning optimizes the precision at a specific point of recall.

Referring to FIG. 3B, method 320 may be performed by one or more processing devices of prediction system 105 and/or a media item platform for predicting review decisions. Method 320 may be used to process the current media item 116 based on the media item prediction value 169. In some implementations, block 310 of FIG. 3A includes method 320. Method 320 may be performed by an application or a background thread executing on one or more processing devices of prediction system 105 and/or the media item platform. As described herein, threshold conditions may be one or more of a threshold media item prediction value, a probability, a score, a level of confidence, etc. For example, a first threshold condition may be a media item prediction value of 99% or greater. In some implementations, threshold conditions may be a combination of one or more of a threshold media item prediction value, a probability, a score, a level of confidence, etc. For example, a first threshold condition may be meeting a first media item prediction value and a threshold level of confidence.

At block 322, processing device determines whether the calculated media item prediction value 169 satisfies a first threshold condition. Responsive to the calculated media item prediction value 169 satisfying the first threshold condition, flow continues to block 324. Responsive to the calculated media item prediction value 169 not satisfying the first threshold condition, flow continues to block 326.

At block 324, processing device prevents playback of the current media item 116 via the media item platform. For example, if the media item prediction value 169 meets a first probability (e.g., is at or above 99% probability) that the current media item 116 contains a type of content (e.g., that is inappropriate, that has technical issues, that infringes rights of a content owner, etc.), the current media item 116 may be blocked by the media item platform. In some implementations, an indication of the type of content (e.g., in appropriate, technical issues, infringement, etc.) may be transmitted to the content owner device 140 that uploaded the current media item 116. The content owner device may modify (e.g., or replace) the current media item 116 and upload the modified (or new) media item 112.

At block 326, processing device determines whether the calculated media item prediction value 168 satisfies a second threshold condition. Responsive to the calculated media item prediction value 168 satisfying the second threshold condition, flow continues to block 328. Responsive to the calculated media item prediction value 168 not satisfying the second threshold condition, flow continues to block 330.

At block 328, processing device allows playback of the media item via the media item platform. For example, if the media item prediction value 169 meets a second probability (e.g., is less than or equal to 50% probability) that the current media item 116 contains a type of content (e.g., that is inappropriate, that has technical issues, that infringes rights of a content owner, etc.), playback of the current media item 116 may be allowed (e.g., current media item 116 may be made accessible for playback via the media item platform). In some implementations, an indication that playback of the current media item 116 is allowed via the media item platform may be transmitted to the content owner device 140 that uploaded the current media item 116.

At block 330, processing device determines whether the calculated media item prediction value 169 satisfies a third threshold condition. Responsive to the calculated media item prediction value 169 satisfying the third threshold condition, flow continues to block 332. Responsive to the calculated media item prediction value 169 not satisfying the third threshold condition, flow ends.

At block 332, processing device causes the current media item 116 to be reviewed to generate a label 164 indicating whether playback is to be allowed via the media item platform. In some implementations, the third threshold condition is between the first and second threshold conditions (e.g., lower probability than the first threshold condition and higher probability than the second threshold condition, for example 50-99% probability). The processing device may cause the current media item 116 to be manually reviewed.

At block 334, processing device receives the generated label 164 for the current media item 116. The processing device may receive the generated label 164 that was generated by a user (e.g., administrator of the media item platform) that manually reviewed the current media item 116 responsive to the media item prediction value 169 meeting the third threshold condition.

In some implementations, at block 336, processing device adjusts weights (e.g., of parameters 191 of model 190) for generating segment prediction values 168 based on the generated label 164 (e.g., re-tunes the trained machine learning model 190).

At block 338, processing device determines whether the generated label 164 indicates to allow playback. Responsive to the generated label 164 indicating to allow playback, flow continues to block 328. Responsive to the generated label 164 indicating not to allow playback, flow continues to block 324.

Figure 3C:
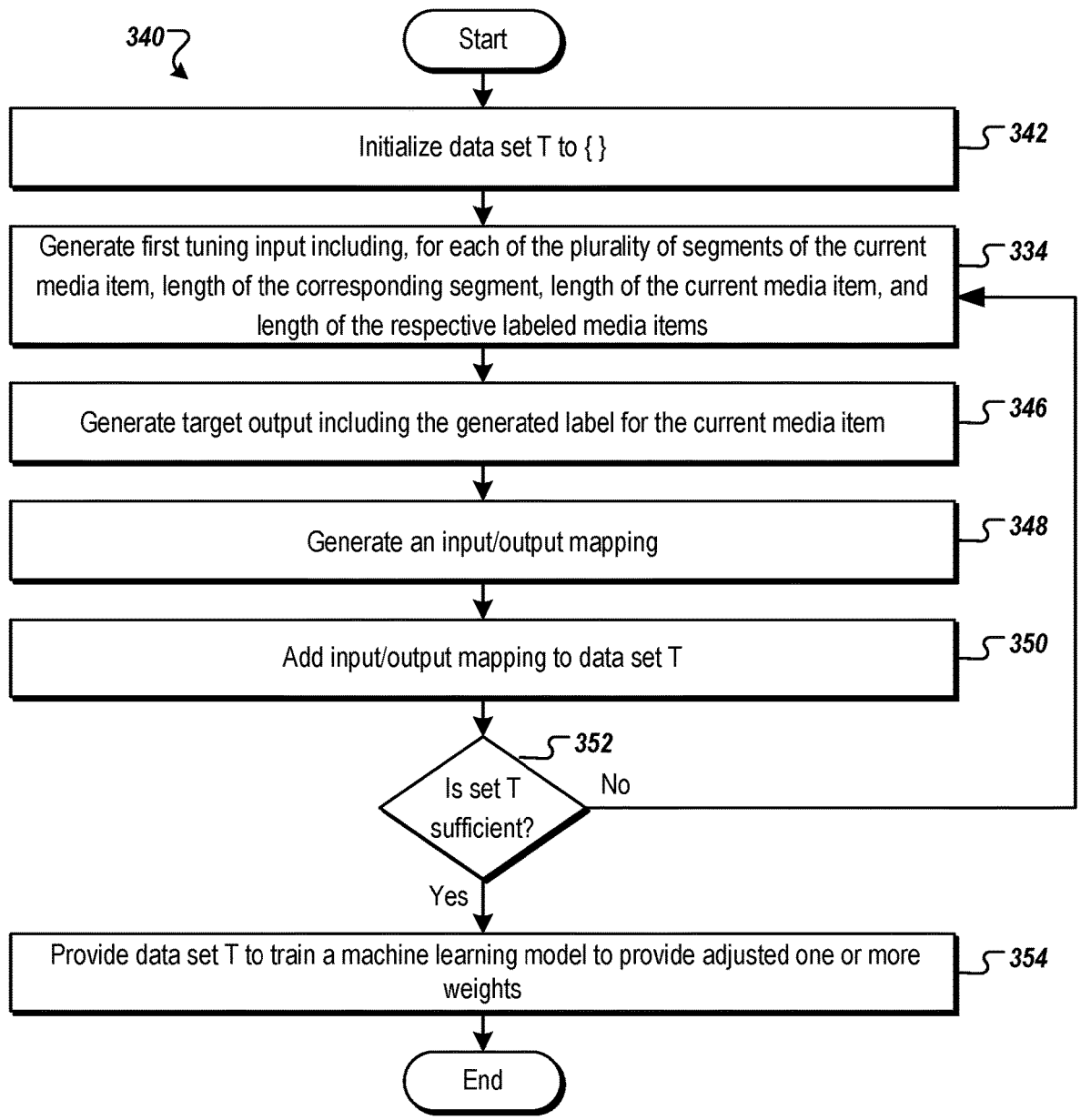

Referring to FIG. 3C, method 340 may be performed by one or more processing devices of prediction system 105 for predicting review decisions. Prediction system 105 may use method 340 to train a machine learning model, in accordance with implementations of the disclosure. In one implementation, some or all the operations of method 340 may be performed by one or more components of system 100 of FIG. 1. In other implementations, one or more operations of method 340 may be performed by tuning set generator 171 of server machine 170 as described with respect to FIGS. 1-2.

Method 340 generates tuning data for a machine learning model. In some implementations, at block 342 processing logic implementing method 300 initializes a data set (e.g., tuning set) T to an empty set.

At block 344, processing logic generates tuning input that includes, for each of the segments 214 of the current media item 116, length 212 of the corresponding segment 214, length 216 of the current media item 116, and length 218 of the respective labeled media items 114 (e.g., that have a segment that is similar to a segment of the current media item 116).

At block 346, processing logic generates a target output for one or more of the tuning inputs. The target output may include the label 164 of current media item 116. In some implementations, the label 164 may be received at block 334 of FIG. 3B.

At block 348, processing logic optionally generates mapping data that is indicative of an input/output mapping (e.g., information 162 associated a current media item 116 mapped to label 164 of the current media item 116). The input/output mapping (or mapping data) may refer to the tuning input (e.g., one or more of the tuning inputs described herein), the target output for the tuning input (e.g., where the target output identifies an indication of a preference of a user to cancel respective transmissions), and an association between the tuning input(s) and the target output.

At block 350, processing logic adds the mapping data to data set T initialized at block 342.

At block 352, processing logic branches based on whether tuning set T is sufficient for training machine learning model 190. If so, execution proceeds to block 354, otherwise, execution continues back at block 344. It should be noted that in some implementations, the sufficiency of tuning set T may be determined based simply on the number of input/output mappings in the tuning set, while in some other implementations, the sufficiency of tuning set T may be determined based on one or more other criteria (e.g., a measure of diversity of the tuning examples, accuracy, etc.) in addition to, or instead of, the number of input/output mappings.

At block 354, processing logic provides tuning set T to train machine learning model 190. In one implementation, tuning set T is provided to tuning engine 181 of server machine 180 to perform the training or re-training of the model 190. In some implementations, training or re-training of the model includes adjusting weights of the parameters 191 of the model 190 (see block 336 of FIG. 3B). After block 354, the machine learning model 190 may be trained or ret-trained based on the tuning set T and the trained machine learning model 190 may be implemented (e.g., by prediction manager 132) to predict review decisions for current media items 116.

Figure 3D:
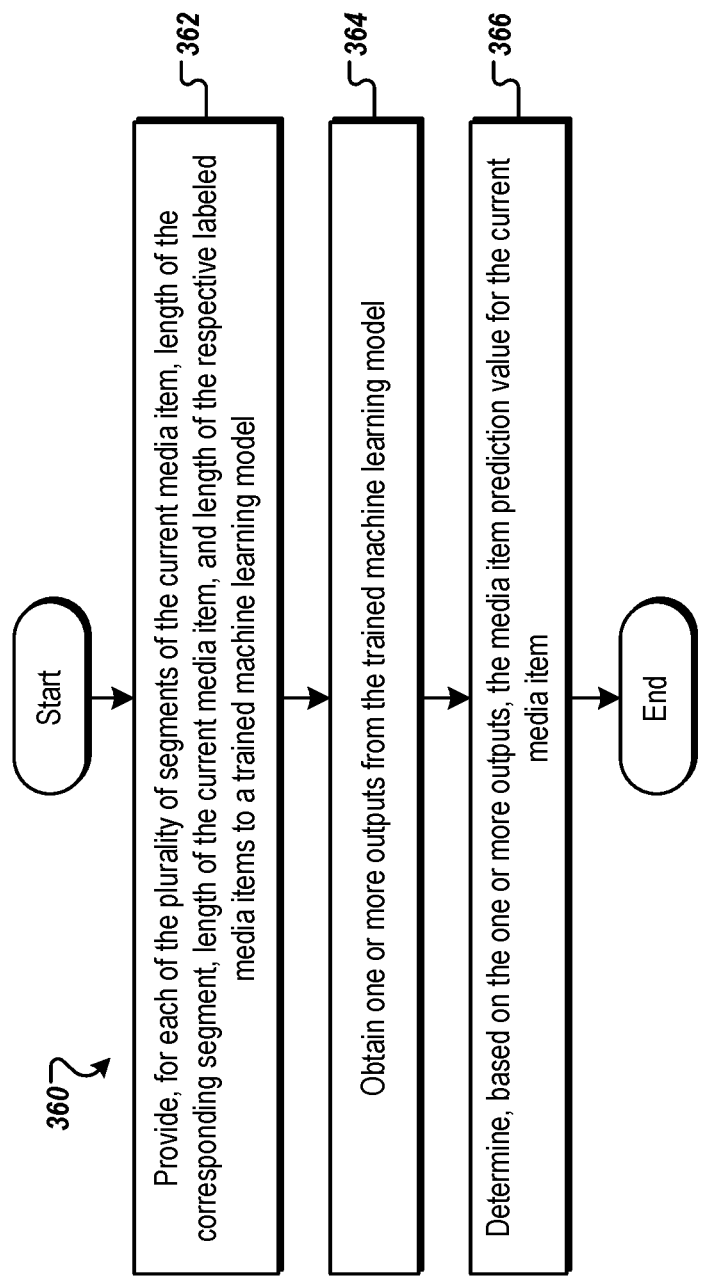

Referring to FIG. 3D, method 360 may be performed by one or more processing devices of prediction system 105 for predicting review decisions. Method 360 may be used to predict review decisions. Method 360 may be performed by an application or a background thread executing on one or more processing devices of prediction system 105 (e.g., prediction manager 132).

At block 362, the processing device provides, for each of the segments 214 of the current media item 116, length 212 of the corresponding segment 214, length 216 of the current media item 116, and length 218 of the respective labeled media items 114 to a trained machine learning model 190. The trained machine learning model 190 may be trained by method 340 of FIG. 3C. The trained machine learning model 190 may perform one or more of blocks 306-308 of method FIG. 3A. For example, the trained machine learning model may determine segment prediction values 168 based on the tuning input provided in block 362 and the parameters 191. In some implementations, the trained machine learning model may process the segment prediction values 168 (e.g., multiply the segment prediction values 168 together, combine the segment prediction values 168) to generate a media item prediction value 169.

At block 344, the processing device may obtain one or more outputs from the trained machine learning model 190. At block 346, the processing device may determine, based on the one or more outputs, the media item prediction value 169 for the current media item 116. In some implementations, the processing device may extract, from one or more outputs, a level of confidence that the media item prediction value 169 would correspond to (e.g., match) a generated label 164 (e.g., label 164 received responsive to manual review of the current media item 116).

FIGS. 4A-B depict tables 400 associated with predicting review decisions of a media item 112, in accordance with an implementation of the disclosure. As used herein, the terms "positive review" (e.g., rated as good, actually good, good reviews, etc.) and "negative review" (rated as bad, actually bad, bad reviews) may be indicative of properties or a label 164 of a media item 112. In some implementations "negative review" may be a label that indicates the media item 112 contains a type of content or property (e.g., that is inappropriate, has technical issues, infringes others' rights, etc.) and "positive review" may be a label that indicates an absence of the type of content or property. In some implementations, a media item 112 may be simultaneously associated with multiple labels. For example, a first label of the media item 112 may indicate an age-appropriateness rating (e.g., teenager and above), a second label of the media item 112 may indicate the media item 112 is suitable for particular advertisements, a third label of the media item 112 may indicate particular technical issues (e.g., issues with the captions), etc. Labels may be indicative of particular type of content that is inappropriate (e.g., includes one or more of sexual content, violent or repulsive content, hateful or abusive content, harmful dangerous acts, child abuse, promoting terrorism, being spam or misleading, etc.), infringes rights, has technical issues (e.g., issues with captions, etc.), has a rating (e.g., age-appropriateness rating, etc.), is suitable for advertisements, etc.

FIG. 4A depicts a table 400A associated with a label 164 for a media item 112 (e.g., labeled media item 114), in accordance with an implementation of the disclosure. The media item 112 may have been manually reviewed to be assigned a label 164. As depicted in table 400A, the manual reviews resulted in a label 164 indicating a 79% probability of positive review for the media item 112 and a 21% probability of negative review for the media item 112. Positive review may indicate that the media item does not contain content that is inappropriate or has technical issues. Negative review may indicate that the media item does contain content that is inappropriate or has technical issues. Although the terms "positive review" and "negative review" and the term "type of content" are used herein, it is understood that the present disclosure applies to any type of label of a media item 112.

Manual reviews may be partially accurate. For example, during manual review, one or more portions of the media item 112 may be reviewed and one or more other portions of the media item 112 may not be reviewed (e.g., spot-checking portions of the media item 112, skimming the media item 112, etc.). Different users may provide different labels for the same media item 112. For example, for a label of provocative dancing, a first user may consider dancing in a media item 112 not to be provocative enough to merit the negative review label and a second user may consider the dancing in the media item 112 to be provocative enough to merit the negative review label.

Actual accuracy may be determined by a manual review by an administrator (e.g., supervisor of the users that performed the initial manual reviews). As depicted in table 400A, the actual values result in a label 164 indicating a 76% probability of positive review for the media item 112 (e.g., actually being positive, administrator would assign a positive review label) and a 24% probability of negative review for the media item 112 (e.g., actually being negative, an administrator would assign a negative review label). Values from table 400A may be used in calculating the media item prediction value 169.

The actual percentages in table 400A may be replaced with actual data, when available. The values in table 400A may be updated periodically as the distribution changes. The values in table 400A may have recency bias (e.g., more recent reviews of media items 112 may be weighted more heavily than less recent reviews of the media items 112).

FIG. 4B depicts a table 400B illustrating predicting review decisions of media items 112, in accordance with an implementation of the disclosure.

As discussed herein, equations may be used for calculating segment prediction values 168. A first segment 214A of the current media item 116 may be similar to a corresponding first segment of a first labeled media item 114A that has a "positive review" label and a second segment 214B of the current media item 116 may be similar to a corresponding second segment of a second labeled media item 114B that has a "negative review" label. The probability that a segment of the current media item 116 has a "positive review" label based on being similar to labeled media item 114A that has a "positive review" label (e.g., good from good reviews) may be expressed by a first equation:

$$x*(1-y)$$

The probability that a segment of the current media item 116 has a "negative review" label based on being similar to labeled media item 114A that has a "positive review" label (e.g., good from good reviews) may be expressed by a second equation:

$$(1-x)*y$$

The segment prediction value 168 may be calculated based on the first and second equations as described in block 306 of FIG. 3A.

Figure 5:
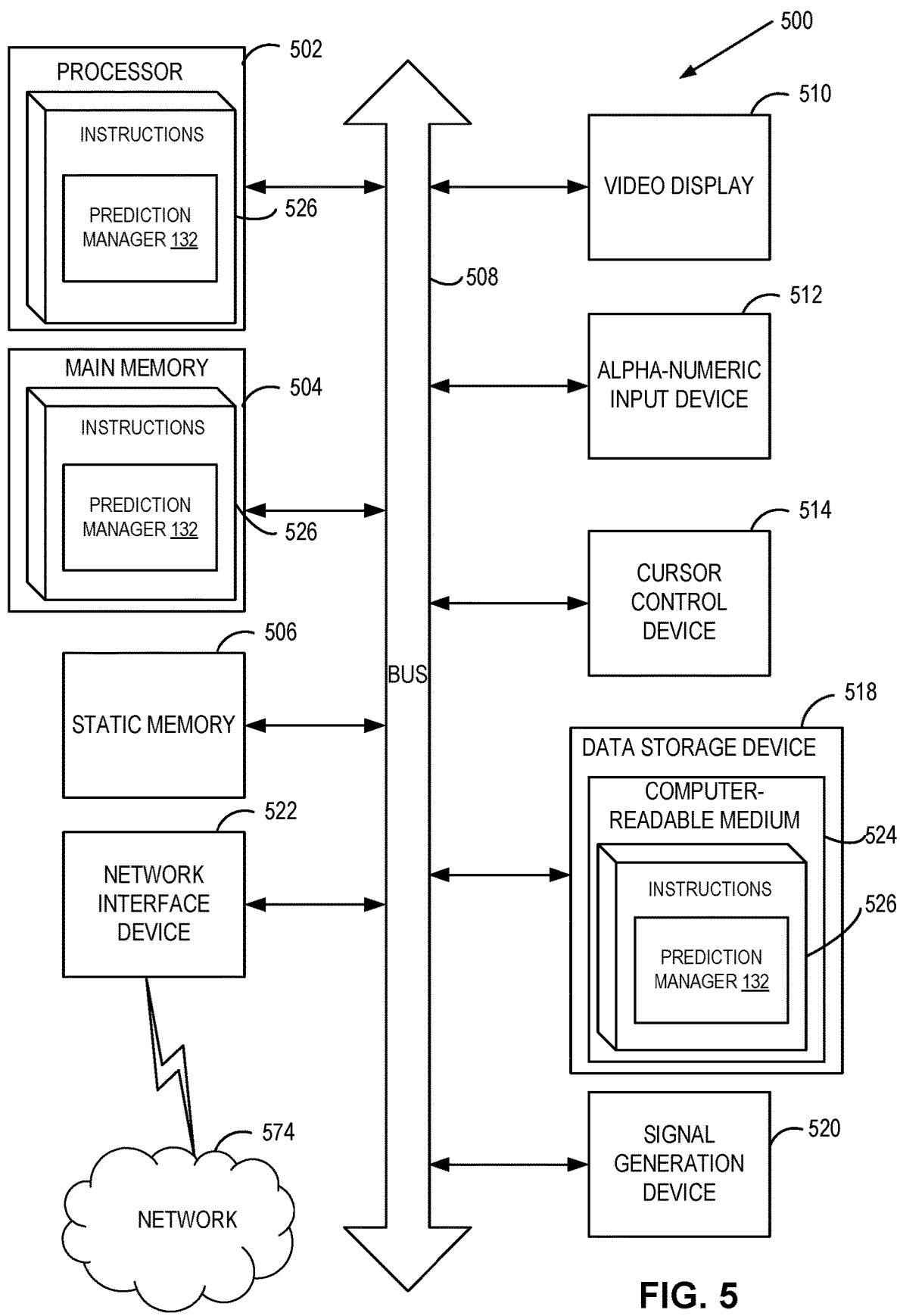
FIG. 5 is a block diagram illustrating one implementation of a computer system, in accordance with implementations of the disclosure.

FIG. 5 is a block diagram illustrating one implementation of a computer system, in accordance with an implementation of the disclosure. In certain implementations, computer system 500 may be connected (e.g., via a network, such as a Local Area Network (LAN), an intranet, an extranet, or the Internet) to other computer systems. Computer system 500 may operate in the capacity of a server or a client computer in a client-server environment, or as a peer computer in a peer-to-peer or distributed network environment. Computer system 500 may be provided by a personal computer (PC), a tablet PC, a set-top box (STB), a Personal Digital Assistant (PDA), a cellular telephone, a web appliance, a server, a network router, switch or bridge, or any device capable of executing a set of instructions (sequential or otherwise) that specify actions to be taken by that device. Further, the term "computer" shall include any collection of computers that individually or jointly execute a set (or multiple sets) of instructions to perform any one or more of the methods described herein.

In a further aspect, the computer system 500 may include a processing device 502, a volatile memory 504 (e.g., random access memory (RAM)), a non-volatile memory 506 (e.g., read-only memory (ROM) or electrically-erasable programmable ROM (EEPROM)), and a data storage device 516, which may communicate with each other via a bus 508.

Processing device 502 may be provided by one or more processors such as a general purpose processor (such as, for example, a complex instruction set computing (CISC) microprocessor, a reduced instruction set computing (RISC) microprocessor, a very long instruction word (VLIW) microprocessor, a microprocessor implementing other types of instruction sets, or a microprocessor implementing a combination of types of instruction sets) or a specialized processor (such as, for example, an application specific integrated circuit (ASIC), a field programmable gate array (FPGA), a digital signal processor (DSP), or a network processor).

Computer system 500 may further include a network interface device 522. Computer system 500 also may include a video display unit 510 (e.g., an LCD), an alphanumeric input device 512 (e.g., a keyboard), a cursor control device 514 (e.g., a mouse), and a signal generation device 520.

In some implementations, data storage device 516 may include a non-transitory computer-readable storage medium 524 on which may store instructions 526 encoding any one or more of the methods or functions described herein, including instructions encoding the prediction manager 132 of FIG. 1 and for implementing one or more of methods 300, 320, 340, or 360.

Instructions 526 may also reside, completely or partially, within volatile memory 504 and/or within processing device 502 during execution thereof by computer system 500, hence, volatile memory 504 and processing device 502 may also constitute machine-readable storage media.

While computer-readable storage medium 524 is shown in the illustrative examples as a single medium, the term "computer-readable storage medium" shall include a single medium or multiple media (e.g., a centralized or distributed database, and/or associated caches and servers) that store the one or more sets of executable instructions. The term "computer-readable storage medium" shall also include any tangible medium that is capable of storing or encoding a set of instructions for execution by a computer that cause the computer to perform any one or more of the methods described herein. The term "computer-readable storage medium" shall include, but not be limited to, solid-state memories, optical media, and magnetic media.

The methods, components, and features described herein may be implemented by discrete hardware components or may be integrated in the functionality of other hardware components such as ASICS, FPGAs, DSPs or similar devices. In addition, the methods, components, and features may be implemented by firmware modules or functional circuitry within hardware devices. Further, the methods, components, and features may be implemented in any combination of hardware devices and computer program components, or in computer programs.

Unless specifically stated otherwise, terms such as "identifying," "processing," "generating," "calculating," "processing," "determining," "preventing," "allowing," "causing," "adjusting," "training," "tuning," or the like, refer to actions and processes performed or implemented by computer systems that manipulates and transforms data represented as physical (electronic) quantities within the computer system registers and memories into other data similarly represented as physical quantities within the computer system memories or registers or other such information storage, transmission or display devices. Also, the terms "first," "second," "third," "fourth," etc. as used herein are meant as labels to distinguish among different elements and may not have an ordinal meaning according to their numerical designation.

Examples described herein also relate to an apparatus for performing the methods described herein. This apparatus may be specially constructed for performing the methods described herein, or it may include a general purpose computer system selectively programmed by a computer program stored in the computer system. Such a computer program may be stored in a computer-readable tangible storage medium.

The methods and illustrative examples described herein are not inherently related to any particular computer or other apparatus. Various general purpose systems may be used in accordance with the teachings described herein, or it may prove convenient to construct more specialized apparatus to perform methods 300, 320, 340, and 360 and/or each of their individual functions, routines, subroutines, or operations. Examples of the structure for a variety of these systems are set forth in the description above.

The above description is intended to be illustrative, and not restrictive. Although the present disclosure has been described with references to specific illustrative examples and implementations, it will be recognized that the present disclosure is not limited to the examples and implementations described. The scope of the disclosure should be determined with reference to the following claims, along with the full scope of equivalents to which the claims are entitled.

What is claimed is:

1. A method comprising:
    identifying a current media item to be processed, the current media item comprising a current digital video or current digital audio;
    processing a plurality of labeled media items to identify labeled media items that include at least one respective segment that is similar to one of a plurality of segments of the current media item, the labeled media items comprising labeled digital videos or labeled digital audio, wherein each segment has a corresponding segment length;
    for each of the plurality of segments of the current media item, generating a segment prediction value indicating a particular property associated with a corresponding segment of the current media item based on properties associated with respective labeled media items that each include a respective segment similar to the corresponding segment of the current media item;
    calculating a media item prediction value for the current media item based on a generated segment prediction value of each of the plurality of segments of the current media item; and
    causing the current media item to be processed based on the calculated media item prediction value, wherein the causing of the current media item to be processed comprises causing playback prevention responsive to the calculated media item prediction value meeting a first threshold condition, wherein the causing of the current media item to be processed comprises causing playback allowance responsive to the calculated media item prediction value meeting a second threshold condition, and wherein the causing of the current media item to be processed comprises causing review of the current media item responsive to the calculated media item prediction value meeting a third threshold condition.

2. The method of claim 1, wherein:
    each of the labeled media items is assigned a respective label; and
    each of the plurality of segments of the current media item at least partially matches one or more segments of the labeled media items.

3. The method of claim 1, wherein the generating, for each of the plurality of segments of the current media item, of the segment prediction value for the corresponding segment is based on a plurality of parameters comprising at least one of length of the corresponding segment, length of the current media item, or length of the respective labeled media items that each include the respective segment similar to the corresponding segment of the current media item.

4. The method of claim 1, further comprising:
    determining that a first segment of the current media item matches a first corresponding segment of a first labeled media item;
    determining that a second segment of the current media item matches a second corresponding segment of a second labeled media item;
    determining that the first segment is a sub-segment of the second segment, wherein the second segment comprises the first segment and a third segment, wherein the generating of the segment prediction value for each of the plurality of segments comprises:
  generating a first segment prediction value indicating a first label for the first segment based on a first respective label of the first labeled media item and a second respective label of the second labeled media item; and
  generating a second segment prediction value indicating a second label for the third segment based on the second respective label of the second labeled media item, wherein the calculating of the media item prediction value is based on the generated first segment prediction value and the generated second segment prediction value.

5. The method of claim 1, wherein:
the playback prevention is via a media item platform;
the playback allowance is via the media item platform; and
the causing of the current media item to be reviewed is to generate a label indicating whether playback of the current media item is to be allowed via the media item platform.

6. The method of claim 5, wherein the segment prediction value of each of the plurality of segments is generated based on a plurality of parameters and one or more weights associated with one or more of the plurality of parameters.

7. The method of claim 6, further comprising adjusting the one or more weights based on the generated label for the current media item.

8. The method of claim 7, wherein:
the adjusting of the one or more weights comprises training, based on tuning input and target tuning output for the tuning input, a machine learning model to provide adjusted one or more weights;
the tuning input comprises, for each of the plurality of segments of the current media item, length of the corresponding segment, length of the current media item, and length of the respective labeled media items that each include the respective segment similar to the corresponding segment of the current media item; and
the tuning target output for the tuning input comprises the generated label for the current media item.

9. A non-transitory machine-readable storage medium storing instructions which, when executed cause a processing device to perform operations comprising:
  identifying a current media item to be processed, the current media item comprising a current digital video or current digital audio;
  processing a plurality of labeled media items to identify labeled media items that include at least one respective segment that is similar to one of a plurality of segments of the current media item, the labeled media items comprising labeled digital videos or labeled digital audio, wherein each segment has a corresponding segment length;
  for each of the plurality of segments of the current media item, generating a segment prediction value indicating a particular property associated with a corresponding segment of the current media item based on properties associated with respective labeled media items that each include a respective segment similar to the corresponding segment of the current media item;
  calculating a media item prediction value for the current media item based on a generated segment prediction value of each of the plurality of segments of the current media item; and
  causing the current media item to be processed based on the calculated media item prediction value, wherein the causing of the current media item to be processed comprises causing playback prevention responsive to the calculated media item prediction value meeting a first threshold condition, wherein the causing of the current media item to be processed comprises causing playback allowance responsive to the calculated media item prediction value meeting a second threshold condition, and wherein the causing of the current media item to be processed comprises causing review of the current media item responsive to the calculated media item prediction value meeting a third threshold condition.

10. The non-transitory machine-readable storage medium of claim 9, wherein:
each of the labeled media items is assigned a respective label;
each of the plurality of segments of the current media item at least partially matches one or more segments of the labeled media items; and
the generating, for each of the plurality of segments of the current media item, of the segment prediction value for the corresponding segment is based on a plurality of parameters comprising at least one of length of the corresponding segment, length of the current media item, or length of the respective labeled media items that each include the respective segment similar to the corresponding segment of the current media item.

11. The non-transitory machine-readable storage medium of claim 9, wherein the operations further comprise:
  determining that a first segment of the current media item matches a first corresponding segment of a first labeled media item;
  determining that a second segment of the current media item matches a second corresponding segment of a second labeled media item;
  determining that the first segment is a sub-segment of the second segment, wherein the second segment comprises the first segment and a third segment, wherein the generating of the segment prediction value for each of the plurality of segments comprises:
    generating a first segment prediction value indicating a first label for the first segment based on a first respective label of the first labeled media item and a second respective label of the second labeled media item; and
    generating a second segment prediction value indicating a second label for the third segment based on the second respective label of the second labeled media item, wherein the calculating of the media item prediction value is based on the generated first segment prediction value and the generated second segment prediction value.

12. The non-transitory machine-readable storage medium of claim 9, wherein:
the playback prevention is via a media item platform;
the playback allowance is via the media item platform to be allowed; and
the causing of the current media item to be reviewed is to generate a label indicating whether playback of the current media item is to be allowed via the media item platform.

13. The non-transitory machine-readable storage medium of claim 12, wherein:
the segment prediction value of each of the plurality of segments is generated based on a plurality of parameters and one or more weights associated with one or more of the plurality of parameters; and the operations further comprise adjusting the one or more weights based on the generated label for the current media item.

14. The non-transitory machine-readable storage medium of claim 13, wherein:

the adjusting of the one or more weights comprises training, based on tuning input and target tuning output for the tuning input, a machine learning model to provide adjusted one or more weights;

the tuning input comprises, for each of the plurality of segments of the current media item, length of the corresponding segment, length of the current media item, and length of the respective labeled media items that each include the respective segment similar to the corresponding segment of the current media item; and the tuning target output for the tuning input comprises the generated label for the current media item.

15. A system comprising:

a memory to store instructions; and a processing device communicably coupled to the memory, the processing device being configured to execute the instructions to:

identify a current media item to be processed, the current media item comprising a current digital video or current digital audio;

process a plurality of labeled media items to identify labeled media items that include at least one respective segment that is similar to one of a plurality of segments of the current media item, the labeled media items comprising labeled digital videos or labeled digital audio, wherein each segment has a corresponding segment length;

for each of the plurality of segments of the current media item, generate a segment prediction value indicating a particular property associated with a corresponding segment of the current media item based on properties associated with respective labeled media items that each include a respective segment similar to the corresponding segment of the current media item;

calculate a media item prediction value for the current media item based on a generated segment prediction value of each of the plurality of segments of the current media item; and cause the current media item to be processed based on the calculated media item prediction value, wherein;

to cause the current media item to be processed responsive to the calculated media item prediction value meeting a first threshold condition, the processing device is to cause playback prevention;

to cause the current media item to be processed responsive to the calculated media item prediction value meeting a second threshold condition, the processing device is to cause playback allowance; and to cause the current media item to be processed responsive to the calculated media item prediction value meeting a third threshold condition, the processing device is to cause review of the current media item.

16. The system of claim 15, wherein:

each of the labeled media items is assigned a respective label;

each of the plurality of segments of the current media item at least partially matches one or more segments of the labeled media items; and the processing device is to generate, for each of the plurality of segments of the current media item, of the segment prediction value for the corresponding segment is based on a plurality of parameters comprising at least one of length of the corresponding segment, length of the current media item, or length of the respective labeled media items that each include the respective segment similar to the corresponding segment of the current media item.

17. The system of claim 15, wherein the processing device is further to:

determine that a first segment of the current media item matches a first corresponding segment of a first labeled media item;

determine that a second segment of the current media item matches a second corresponding segment of a second labeled media item;

determine that the first segment is a sub-segment of the second segment, wherein the second segment comprises the first segment and a third segment, wherein to generate the segment prediction value for each of the plurality of segments, the processing device is to:

generate a first segment prediction value indicating a first label for the first segment based on a first respective label of the first labeled media item and a second respective label of the second labeled media item; and generate a second segment prediction value indicating a second label for the third segment based on the second respective label of the second labeled media item, wherein the processing device is to calculate the media item prediction value based on the generated first segment prediction value and the generated second segment prediction value.

18. The system of claim 15, wherein:

the playback prevention is via a media item platform;

the playback allowance is via the media item platform to be allowed; and responsive to the calculated media item prediction value meeting the third threshold condition, the processing device is to cause the current media item to be reviewed to generate a label indicating whether playback of the current media item is to be allowed via the media item platform.

19. The system of claim 18, wherein:

the segment prediction value of each of the plurality of segments is generated based on a plurality of parameters and one or more weights associated with one or more of the plurality of parameters; and the processing device is further to adjust the one or more weights based on the generated label for the current media item.

20. The system of claim 19, wherein:

to adjust the one or more weights, the processing device is to train, based on tuning input and target tuning output for the tuning input, a machine learning model to provide adjusted one or more weights;

the tuning input comprises, for each of the plurality of segments of the current media item, length of the corresponding segment, length of the current media item, and length of the respective labeled media items that each include the respective segment similar to the corresponding segment of the current media item; and the tuning target output for the tuning input comprises the generated label for the current media item.

\* \* \* \* \*